United States Patent
Sayed (10) Patent No.: US 9,872,138 B2
(45) Date of Patent: *Jan. 16, 2018

(54) TECHNIQUES FOR EXCHANGING CONTACT INFORMATION AND ESTABLISHING A CONNECTION VIA A SOCIAL NETWORKING SERVICE

(71) Applicant: Microsoft Technology Licensing, LLC, Redmond, WA (US)

(72) Inventor: Sameer Sayed, San Ramon, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/357,581

(22) Filed: Nov. 21, 2016

(65) Prior Publication Data

US 2017/0134897 A1    May 11, 2017

Related U.S. Application Data

(63) Continuation of application No. 14/145,143, filed on Dec. 31, 2013, now Pat. No. 9,503,413.

(51) Int. Cl.
| | |
|---|---|
| *G06F 15/16* | (2006.01) |
| *H04W 4/02* | (2009.01) |
| *H04L 29/08* | (2006.01) |
| *G06Q 50/00* | (2012.01) |

(52) U.S. Cl.
CPC ........... *H04W 4/021* (2013.01); *G06Q 50/01* (2013.01); *H04L 67/26* (2013.01); *H04L 67/306* (2013.01)

(58) Field of Classification Search
USPC ................................ 709/201, 204, 205, 206
See application file for complete search history.

(56) References Cited

U.S. PATENT DOCUMENTS

| | | | |
|---|---|---|---|
| 7,640,160 B2 * | 12/2009 | Di Cristo | G06F 17/279 704/251 |
| 9,503,413 B2 | 11/2016 | Sayed | |
| 2008/0039121 A1 * | 2/2008 | Muller | H04M 7/0036 455/456.3 |
| 2010/0167648 A1 * | 7/2010 | Doutriaux | G07F 1/06 455/41.2 |
| 2011/0251941 A1 * | 10/2011 | Dunwoody | G06Q 20/223 705/37 |

(Continued)

OTHER PUBLICATIONS

"U.S. Appl. No. 14/145,143, Non Final Office Action dated Mar. 23, 2016", 98 pgs.

(Continued)

*Primary Examiner* — Liangche A Wang (74) *Attorney, Agent, or Firm* — Schwegman Lundberg & Woessner, P.A.

(57) ABSTRACT

A method of making it easier for users to interact with each other via a social networking system is disclosed. It is detected that a first user of a social networking system performed an action with respect to a second user of the social networking system. It is interpreted that the action of the first user corresponds to a command that the first user intends to issue to a social networking system, the command pertaining to the second user. The command is processed by the social networking system on behalf of the first user.

20 Claims, 7 Drawing Sheets

(56) References Cited

U.S. PATENT DOCUMENTS

| | | | |
|---|---|---|---|
| 2013/0185155 A1* | 7/2013 | Colando | G06Q 30/0215 705/14.54 |
| 2013/0314448 A1* | 11/2013 | Toksvig | G09G 3/3426 345/690 |
| 2014/0067931 A1* | 3/2014 | Harik | H04L 67/306 709/204 |
| 2014/0156566 A1* | 6/2014 | Kabiljo | G06N 99/005 706/12 |
| 2015/0189028 A1 | 7/2015 | Sayed | |

OTHER PUBLICATIONS

"U.S. Appl. No. 14/145,143, Notice of Allowance dated Jul. 20, 2016", 10 pgs.

"U.S. Appl. No. 14/145,143, PTO Response to Rule 312 Communication dated Oct. 21, 2016", 2 pgs.

"U.S. Appl. No. 14/145,143, Response filed Jun. 23, 2016 to Non Final Office Action dated Mar. 23, 2016", 11 pgs.

* cited by examiner

TECHNIQUES FOR EXCHANGING CONTACT INFORMATION AND ESTABLISHING A CONNECTION VIA A SOCIAL NETWORKING SERVICE

PRIORITY

This application is a Continuation of and claims the benefit of priority to U.S. patent application Ser. No. 14/145,143, filed Dec. 31, 2013, the contents of which are incorporated herein by reference in their entirety.

TECHNICAL FIELD

This application relates generally to the technical field of social networking, and, in one specific example, to making it easier for business people to establish connections to one another with respect to a social networking system.

BACKGROUND

A social networking system (e.g., Facebook or LinkedIn) may enable users to declare their relationships with each other (e.g., as colleagues, acquaintances, friends, fans, followers, etc.). For example, a first person may declare himself to be a friend of a second person. The second person may then confirm the declaration of friendship of the first person. Similarly, the first person and the second person may acknowledge having a professional relationship with one another (e.g., as having worked together as colleagues for a current or past employer).

In some circumstances, it may be difficult or cumbersome for a user to establish a relationship with another user via the social networking system. For example, a first user may personally know or be acquainted with a second user, but the first user may be unable to locate an online profile of the second user with respect to the social networking system. Or the first user may be unwilling or unable to complete the steps (e.g., declaration and acknowledgement steps) required to establish the relationship with second user (e.g., because of time constraints). Because an entity associated with the social networking system (e.g., an owner) may benefit from establishment of such relationships between users of the social networking system (e.g., from advertising, subscription, or other revenue), the entity may wish to simplify procedures for establishing such relationships.

BRIEF DESCRIPTION OF THE DRAWINGS

Some embodiments are illustrated by way of example and not limitation in the figures of the accompanying drawings in which.

DETAILED DESCRIPTION

In the following description, for purposes of explanation, numerous specific details are set forth in order to provide an understanding of various embodiments of the inventive subject matter. It will be evident, however, to those skilled in the art that embodiments may be practiced without these specific details. Further, to avoid obscuring the inventive concepts in unnecessary detail, well-known instruction instances, protocols, structures, and techniques have not been shown in detail. As used herein, the term "or" may be construed in an inclusive or exclusive sense, the term "user" may be construed to include a person or a machine, and the term "interface" may be construed to include an application program interface (API) or a user interface.

In various embodiments, a method of making it easier for users to interact with each other via a social networking system is disclosed. It is detected that a first user of a social networking system performed an action with respect to a second user of the social networking system. It is interpreted that the action of the first user corresponds to a command that the first user intends to issue to a social networking system, the command pertaining to the second user. The command is processed by the social networking system on behalf of the first user.

This method and other methods or embodiments disclosed herein may be implemented as a computer system having one or more modules (e.g., hardware modules or software modules). Such modules may be executed by one or more processors of the computer system. This method and other methods or embodiments disclosed herein may be embodied as instructions stored on a machine-readable medium that, when executed by one or more processors, cause the one or more processors to perform the instructions.

Figure 1:
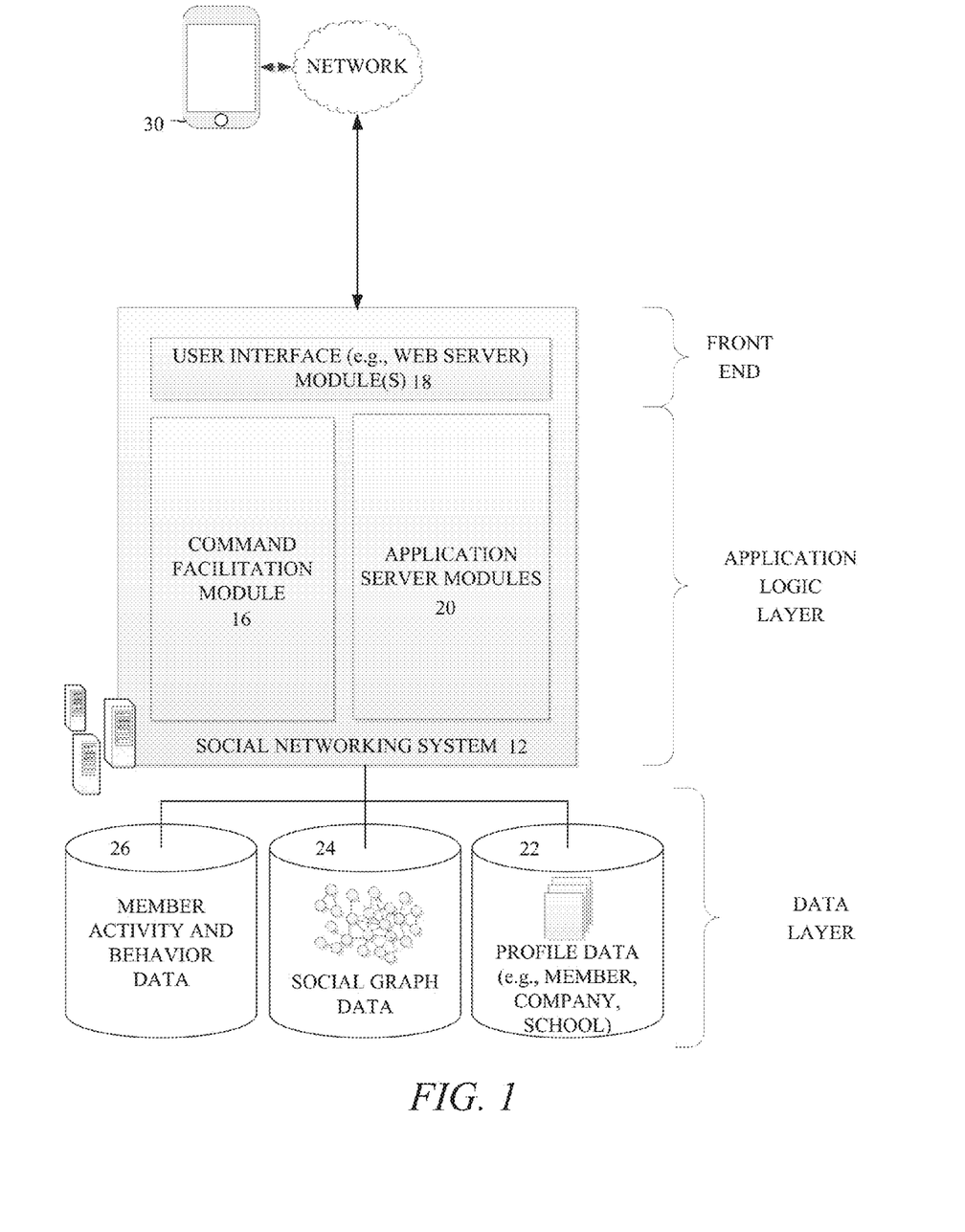
FIG. 1 is a network diagram illustrating an example server system that may be involved in implementing various example embodiments.

FIG. 1 is a network diagram depicting a server system (e.g., social networking system 12) that includes a command facilitation module 16 for responding to requests or commands received from a mobile computing device 30, consistent with some embodiments of the present invention. As described in greater detail below, the command facilitation module 16 receives commands or requests from mobile computing devices, such as that with reference number 30 in FIG. 1. In various embodiments, the command or request may include information, such as a member identifier uniquely identifying a member of the social networking service (e.g., corresponding to a user of the mobile computing device 30), location information identifying a member's current location, an activity identifier identifying a member's current activity state, and so on. Accordingly, the command facilitation module 16 may perform an action on behalf of the user based in part on the information received with the command or request.

As shown in FIG. 1, the social networking system 12 is generally based on a three-tiered architecture, consisting of a front-end layer, application logic layer, and data layer. As is understood by skilled artisans in the relevant computer and Internet-related arts, each module or engine shown in FIG. 1 represents a set of executable software instructions and the corresponding hardware (e.g., memory and processor) for executing the instructions. To avoid obscuring the inventive subject matter with unnecessary detail, various functional modules and engines that are not germane to conveying an understanding of the inventive subject matter have been omitted from FIG. 1. However, a skilled artisan will readily recognize that various additional functional modules and engines may be used with a social networking system, such as that illustrated in FIG. 1, to facilitate additional functionality that is not specifically described herein. Furthermore, the various functional modules and engines depicted in FIG. 1 may reside on a single server computer, or may be distributed across several server computers in various arrangements. Moreover, although depicted in FIG. 1 as a three-tiered architecture, the inventive subject matter is by no means limited to such an architecture.

As shown in FIG. 1, the front end layer consists of a user interface module (e.g., a web server) 18, which receives requests from various client-computing devices including one or more mobile computing devices 30, and communicates appropriate responses to the requesting client computing devices. For example, the user interface module(s) 18 may receive requests in the form of Hypertext Transport Protocol (HTTP) requests, or other web-based, application programming interface (API) requests. The client devices may be executing conventional web browser applications, or applications that have been developed for a specific platform to include any of a wide variety of mobile computing devices and mobile-specific operating systems.

As shown in FIG. 1, the data layer includes several databases, including a database 22 for storing data for various entities of the social graph, including member profiles, company profiles, educational institution profiles, as well as information concerning various online or offline groups. Of course, with various alternative embodiments, any number of other entities might be included in the social graph, and as such, various other databases may be used to store data corresponding with other entities.

Consistent with some embodiments, when a person initially registers to become a member of the social networking service, the person will be prompted to provide some personal information, such as his or her name, age (e.g., birth date), gender, interests, contact information, home town, address, the names of the member's spouse and/or family members, educational background (e.g., schools, majors, etc.), current job title, job description, industry, employment history, skills, professional organizations, interests, and so on. This information is stored, for example, as profile data in the database with reference number 22.

Once registered, a member may invite other members, or be invited by other members, to connect via the social networking service. A "connection" may require a bi-lateral agreement by the members, such that both members acknowledge the establishment of the connection. Similarly, with some embodiments, a member may elect to "follow" another member. In contrast to establishing a connection, the concept of "following" another member typically is a uni-lateral operation, and at least with some embodiments, does not require acknowledgement or approval by the member that is being followed. When one member connects with or follows another member, the member who is connected to or following the other member may receive messages or updates (e.g., content items) in his or her personalized content stream about various activities undertaken by the other member. More specifically, the messages or updates presented in the content stream may be authored and/or published or shared by the other member, or may be automatically generated based on some activity or event involving the other member. In addition to following another member, a member may elect to follow a company, a topic, a conversation, a web page, or some other entity or object, which may or may not be included in the social graph maintained by the social networking system. With some embodiments, because the content selection algorithm selects content relating to or associated with the particular entities that a member is connected with or is following, as a member connects with and/or follows other entities, the universe of available content items for presentation to the member in his or her content stream increases.

As members interact with various applications, content, and user interfaces of the social networking system 12, information relating to the member's activity and behavior may be stored in a database, such as the database with reference number 26.

The social networking system 12 may provide a broad range of other applications and services that allow members the opportunity to share and receive information, often customized to the interests of the member. For example, with some embodiments, the social networking system 12 may include a photo sharing application that allows members to upload and share photos with other members. With some embodiments, members of a social networking system 12 may be able to self-organize into groups, or interest groups, organized around a subject matter or topic of interest. With some embodiments, members may subscribe to or join groups affiliated with one or more companies. For instance, with some embodiments, members of the social networking service 12 may indicate an affiliation with a company at which they are employed, such that news and events pertaining to the company are automatically communicated to the members in their personalized activity or content streams. With some embodiments, members may be allowed to subscribe to receive information concerning companies other than the company with which they are employed. Membership in a group, a subscription or following relationship with a company or group, as well as an employment relationship with a company, are all examples of different types of relationships that may exist between different entities, as defined by the social graph and modeled with the social graph data of the database with reference number 24.

The application logic layer includes various application server modules 20, which, in conjunction with the user interface module(s) 12, generates various user interfaces with data retrieved from various data sources or data services in the data layer. With some embodiments, individual application server modules 20 are used to implement the functionality associated with various applications, services and features of the social networking system. For instance, a messaging application, such as an email application, an instant messaging application, or some hybrid or variation of the two, may be implemented with one or more application server modules 20. A photo sharing application may be implemented with one or more application server modules 20. Similarly, a search engine enabling users to search for and browse member profiles may be implemented with one or more application server modules 20. Of course, other applications and services may be separately embodied in their own application server modules 20.

As illustrated in FIG. 1, one application server module is a command facilitation module 16. Accordingly, the command facilitation module 16 may facilitate the issuing of commands by the user, as will be described in more detail below.

Figure 2:
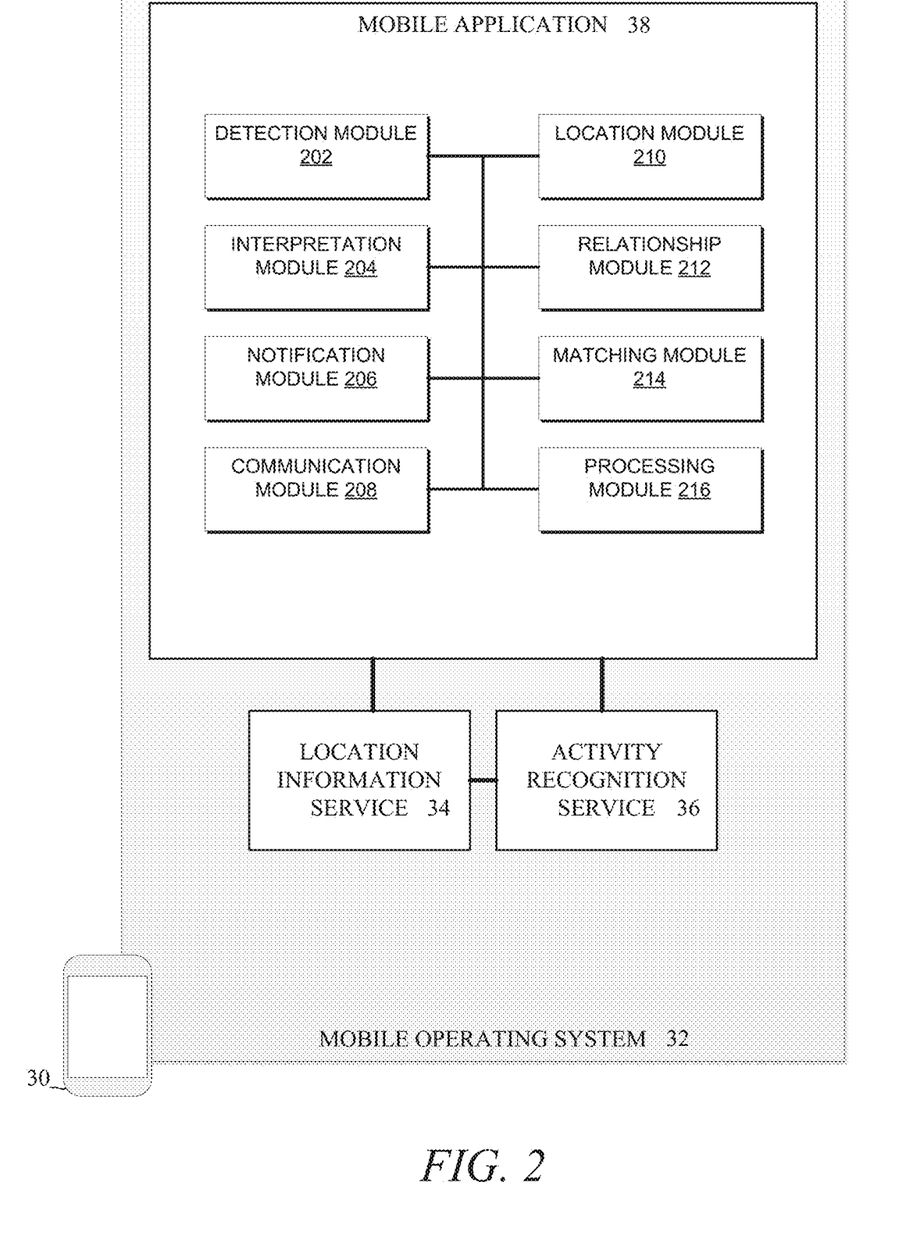
FIG. 2 is a block diagram illustrating an example client system that may be involved in implementing various example embodiments.

FIG. 2 is a functional block diagram depicting some of the functional modules of a mobile computing device 30, consistent with some embodiments of the invention. As is understood by skilled artisans in the relevant computer- and mobile device-related arts, each module or engine shown in FIG. 2 represents a set of executable software instructions and the corresponding hardware (e.g., memory, processor, sensor devices) for executing the instructions, and deriving or generating relevant data. To avoid obscuring the inventive subject matter with unnecessary detail, various functional modules and engines that are not germane to conveying an understanding of the inventive subject matter have been omitted from FIG. 2.

As illustrated in FIG. 2, the mobile computing device 30 includes a mobile operating system 32, which has both a location information service (or, module) 34 and an activity recognition service (or, module) 36. With some embodiments, one of these two services may be a sub-component of the other, or may be combined as a single service or module. In any case, the services 34 and 36 provide an application-programming interface (API) that allows the mobile application 38 to invoke various functions, or access certain data, that are provided and/or derived by the respective services. For example, the location information service 34 may operate with one or more location sensing components or devices (e.g., a GPS component, WiFi® triangulation, iBeacons or other indoor positioning systems, and so forth) to derive location information representing the current location of the mobile computing device 30, as well as the current speed and direction of travel. The mobile application 38, by making an API request to the location information service 34, can obtain this location information (e.g., current location, direction and speed of travel, etc.) of the mobile computing device. Accordingly, with some embodiments, the location information can be included with a content request communicated to a content server, thereby allowing the content server to select content items based at least in part on the current location of the user, or the current location and direction and speed of travel.

With some embodiments, the activity recognition service 36 may be configured to receive information or data signals from one or more motion sensing components or devices, such as an accelerometer, compass, and/or gyroscope. In addition, the activity recognition service may receive location information from a location sensing component or device, such as a GPS component, indoor positioning system (or other location sensing component), and/or a wireless network interface. By analyzing the information or data signals generated by these various sensing components, the activity recognition service 36 can generate information representing the inferred physical activity state of the member of the social networking service. For example, the various sensing components may generate a combination of signals from which the activity recognition service can infer a particular activity state of the member, to include, but certainly not to be limited to: walking, running, sitting, standing, driving in a vehicle, and riding in a vehicle.

With some embodiments, the inferred physical activity state of the member may be represented by a single activity status identifier that is assigned a particular value to represent the most likely current physical activity state of the member (e.g., walking=1, running=2, sitting still=3, standing=4, etc.). In other embodiments, each of several activity status identifiers may be assigned a value or score representing a measure of the likelihood that a member is in a certain physical activity state (e.g., walking=0.90, running=0.45, sitting still=0.03, standing=0.11, etc.). In yet other embodiments, the inferred physical activity state of the member may be represented by a single activity status identifier that is assigned a particular value to represent the most likely current physical activity state of the member, in combination with another value that represents the likelihood or probability that the member is in the inferred physical activity state (e.g., activity state identifier=1, confidence level=0.90). Of course, an activity status identifier may be encoded in any of a number of other ways as well.

Accordingly, when a user of the mobile computing device is walking, an accelerometer, gyroscope and compass will generally detect motion (and direction) consistent with such activity. An activity status identifier may be assigned a particular value (e.g., a number) that identifies the member's current physical activity state, for example, walking or running. Alternatively, a specific activity status identifier for walking may be assigned a value or score representing the probability or likelihood that the member is at that moment engaged in the particular physical activity—that is, for example, walking. Similarly, when a user places his or her mobile computing device flat on a desk or table top, the sensing components will generally detect motion (or lack thereof) that is consistent with such activity.

In some instances, in addition to signals generated by an accelerometer, gyroscope and/or compass, the activity recognition service 36 may also analyze information received from other data sources, to include information from one or more location sensing components (e.g., GPS, iBeacon, etc.). By analyzing location information, including the current location (e.g., latitude and longitude coordinates) as well as the direction and speed of travel the activity recognition service 36 can make meaningful inferences about the member's current activity state. For example, an accelerometer and gyroscope of a mobile computing device may detect motion consistent with a member that may be running, while the member's current location, speed and direction of travel, as evidenced by information received via a GPS component, may indicate that the member is currently on a well-known trail or path, and moving in a direction and speed consistent with the member running on the trail or path. Accordingly, the more information from which the activity status identifier is inferred, the higher the confidence level may be for the particular inferred activity status identified.

With some embodiments, the activity recognition service 36 may use a mobile computing device's network activity status to determine the member's current physical activity state. For example, if a mobile computing device is currently paired and actively communicating with another Bluetooth® device known to be in an automobile or vehicle of the member, and the other sensors are detecting signals consistent with the mobile computing device being within a moving automobile or vehicle, the activity recognition service 36 may indicate a high probability that the member is currently driving. Similarly, if the sensors are detecting signals consistent with the mobile computing device being within a moving automobile or vehicle, but the mobile computing device is not currently paired or connected with a known data network (Bluetooth®, personal area network, controller area network, etc.), the activity recognition service 36 may indicate a high probability that the member is currently riding, but not driving, in a vehicle.

With some embodiments, a mobile application 38 may register a request with the activity recognition service 36 to receive periodic updates regarding the inferred activity state of the user of the mobile computing device 30 who is a member of the social networking service. Accordingly, after receiving the request, the activity recognition service 36 may periodically communicate information to the mobile application 38 about the user's inferred activity state. With some embodiments, the activity recognition service 36 may only provide the mobile application 38 with information concerning the current inferred activity status when there is a change from one status to another, or, when the confidence level for a particular activity status exceeds some predefined threshold. In other embodiments, the mobile application 38 may periodically poll the activity recognition service 36 for the current inferred activity state.

Referring again to FIG. 2, the mobile application 38 includes various modules 202-216. A detection module 202 may be configured to detect actions of a user (e.g., movements, gestures, voice commands, and so on). An interpretation module 204 may be configured to interpret actions of users as corresponding to intentions of the user (e.g., to connect to another user via a social networking system, to exchange a business card with another user, and so on). A notification module 206 may be configured to generate notifications, such as notifications including information pertaining to actions of users with respect to the social networking system. A communication module 208 may be configured to transmit information, such as generated notifications, to devices of users of a social networking system or receive information transmitted from devices of the users. A location module 210 may be configured to determine locations of users of a social networking system (e.g., based on communications with applications of a location-based services system). A relationship module 212 may be configured to manage relationships of users with respect to a social networking system. A matching module 214 may be configured to match received information (e.g., voice recordings) to profiles of users of a social networking system. A processing module 216 may be configured to process a request (e.g., a request by a first user to exchange business cards with a second user or a request by a first user to declare or acknowledge a relationship to a second user with respect to the social networking system).

Although the functionality corresponding to modules 202-216 is depicted and described as being implemented on the client side (e.g., by the mobile application 38), in various embodiments, some or all of the functionality corresponding to modules 202-216 may be implemented on the server side (e.g., by the command facilitation module 16). Thus, in various embodiments, one or more algorithms implemented on the client side or server side may utilize information collected about the user, such as the member's current activity, current location, current gesture, past activity and behavior, social/graph data, profile data, and so on, to facilitate the issuing of a command by the user with respect to the social networking system 12, such as declaring or acknowledging a relationship with the user of the additional mobile device.

Figure 3:
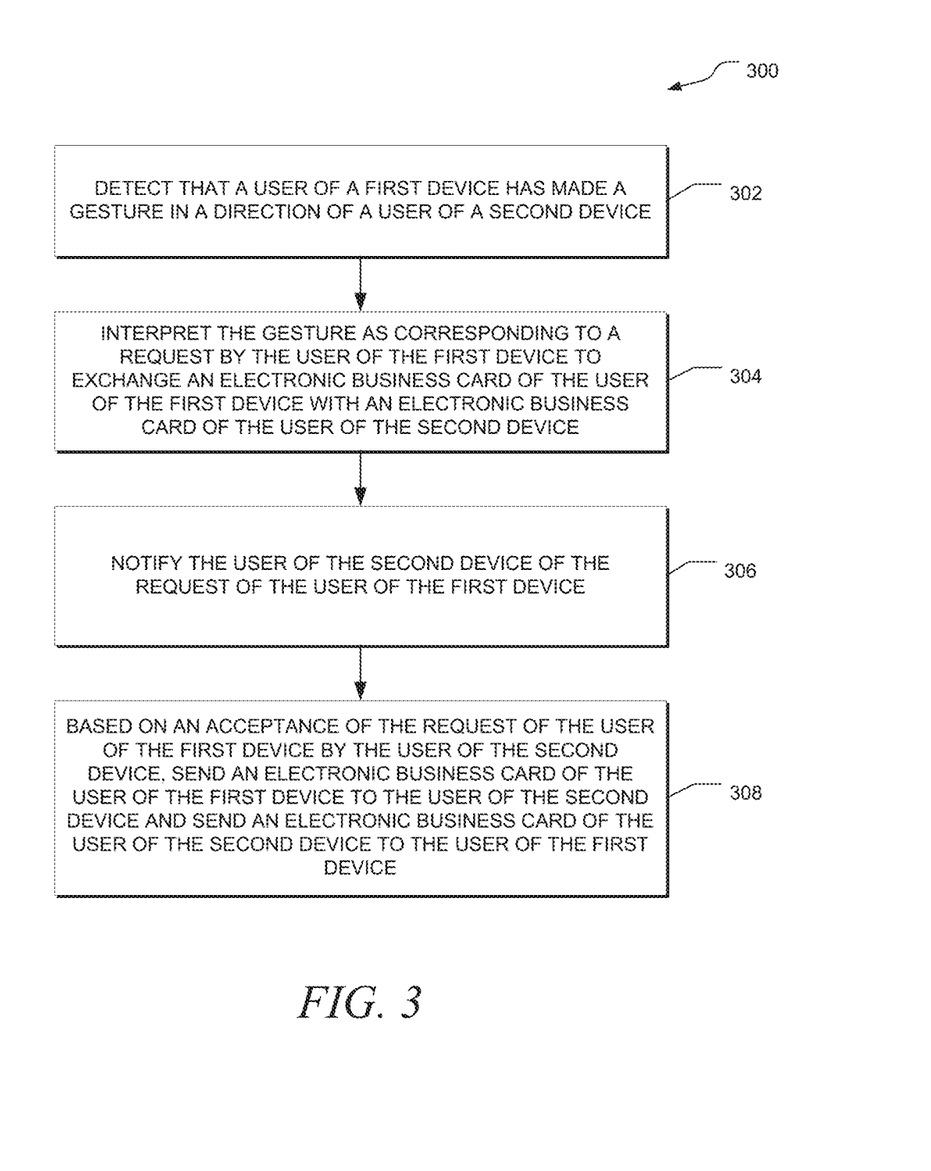
FIG. 3 is a flow chart illustrating example operations of a method of making it easier for users of a social networking system to exchange business cards.

FIG. 3 is a flow chart illustrating example operations of a method 300 of making it easier for users of a social networking system to exchange electronic business cards. In various embodiments, the method 300 is implemented by one or more the modules 202-214 of FIG. 2. For example, at operation 302, the detection module 202 may determine that a user of a first device has made a gesture in a direction of a user of a second device. The detection module 202 may make this determination based on sensor data collected by the first device or the second device, near-field communications between the first device and the second device, activity data collected by the first and/or second device (e.g., from the activity recognition service 36), location data collected by the first and/or second device (e.g., from the location information service 34), and so on. Based on this data, the detection module 202 may determine that the user has made a gesture toward another user, a type of the gesture, the direction of the gesture, and so on. Thus, the detection module 202 may determine that the first user has made a gesture and/or that the user has made a gesture in the direction of a second user.

At operation 304, the interpretation module 204 may interpret the gesture as corresponding to a request by the user of the first device to exchange an electronic business card of the user of the first device with an electronic business card of the user of the second device. For example, the interpretation module 204 may identify that the particular type of the gesture made by the user (e.g., a pointing by the user) means that the user wishes to exchange business cards. Furthermore, the interpretation module 204 determine that an additional user having a location in the direction of the user's gesture (e.g., an additional user present in the direction of the pointing of the user) is the target user with whom the user wishes to exchange business cards. The interpretation module 204 may determine whether that a particular type of gesture corresponds to a request by the user to exchange business cards based on, for example, on a matching of the gesture to a predetermined set of gestures corresponding to the request. The predetermined set of gestures may have been previously established (e.g., by the user or an administrator of the social networking system).

At operation 306, the notification module 206 may generate a notification that includes information pertaining to the request by the first user to exchange business cards with the second user. For example, the notification may specify an identity of the first user (e.g., a name of the first user, a user ID of the first user, information from a profile of the first user, such as a title of the first user, and employer of the first user, and so on), a location of the first user with respect to the second user, and so on. For example, assume that Joe Beans and Fred Jones are present in a same conference room at a convention. Further, assume that the interpretation module 204 has determined that a gesture by Joe Beans in the direction of Fred Jones means that Joe Beans wishes to exchange business with Fred Jones. Based on these determinations, the notification module 206 may generate a notification that is to be communicated to Fred Jones. The notification may specify that Joe Beans is a Program Manager at XYZ corporation who is approximately 10 feet away in the NW direction from Joe Beans and that Jose Beans has indicated that he wishes to exchange business cards with Fred Jones.

The notification module 206 may include any information known about the users in the notifications that may be relevant to the request to exchange business cards. For example, the notification module 206 may identify commonalities between the users (e.g., common interests, associations, affiliations, and so) on between the users based on information contained in the data 22-26, such as the profiles of the users of the social networking system. The notification module 206 may then include information about such commonalities in the notification. The information maintained about the users with respect to the social networking system may include names, usernames, titles, industries of employment, home or work geographical locations, current employers, past employers, referrals, interests, background, specialties, projects, education (e.g., degrees earned, schools attended, dates of graduation, activities and societies participated in, and so on), connections, groups, followers, people following, and so on. Information known about the users may also include information that the social networking system gathers based on monitoring of the behavior of the users with respect to the social networking system. For example, the information may include information pertaining to articles that the users have browsed, groups that the users have participated in (e.g., information about postings the users have made on a group home page), postings that the users have made on their walls (e.g., information about status of users that the users have posted or information about content items that the users have shared), and so on.

At operation 308, the communication module 208 may transmit the generated notification to the second user as part of a request by the first user to exchange business cards with the second user. In various embodiments, based on a receipt of an acceptance of the request by the second user, the processing module 216 may process the request. The processing of the request may include generating a business card based on profile information of the first user and the second user maintained with respect to the social networking system. For example, the processing module 216 may generate a first virtual business card that includes a subset of information known about the first user and a second virtual business card that includes a subset of information known about the second user. In various embodiments, the processing module 216 may select the subset of the information based on commonalities between the first user and the second user. Or the processing module 216 may select the subset of information based on a template of a business card. In various embodiments, a template may be specified by the first user such that the subset of information known about the second user is selected according to information that the first user wishes to have on hand about the second user. Additionally, the template may be specified by the first user may be different than a template specified by the second user. Thus, the business card generated by the processing module 216 for the first user may be different than the business card generated by the processing module 216 for the second user.

Figure 4:
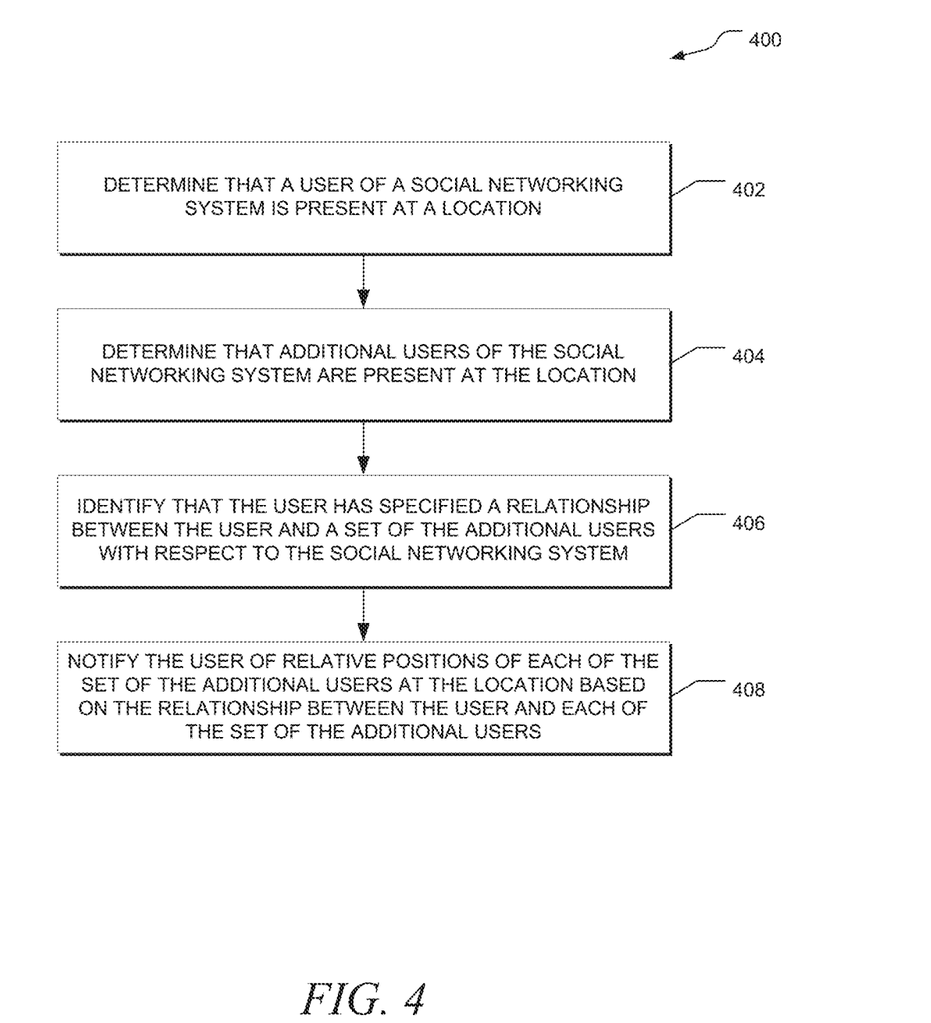
FIG. 4 is a flow chart illustrating example operations of a method of making it easier for users of a social networking system to find each other at a location.

FIG. 4 is a flow chart illustrating example operations of a method 400 of making it easier for users of a social networking system to find each other at a location. In various embodiments, the method 400 is implemented by one or more the modules 202-216 of FIG. 2. At operation 402, the location module 210 determines that a user of the social networking system is present at the location. For example, the location module 210 determines that the user is present a conference, a restaurant, a business, an address, or other location. Such locations may be established and registered with respect to the social networking system (e.g., by users or administrators of the social networking system).

At operation 404, the location module 210 may determine that additional users of the social networking system are present at the same location.

At operation 406, the relationship module 212 may identify that the user has potential, declared, or confirmed relationships with a set of the additional users. For example, the relationship module 212 may identify that the set of the additional users are confirmed connections (or "friends") of the user with respect to the social networking system. Or the relationship module 212 may identify that the set of additional users are followers of the user. Or the relationship module 212 may identify that the set of additional users are followed by the user. Or the relationship module 212 may identify that the user may know the set of additional users or have an interest in the set of additional users (e.g., based on commonalities between the user and the set of additional users).

At operation 408, the notification module 206 may generate a notification that includes information pertaining to the relative positions of each of the set of additional users at the location. For example, the notification module 206 may generate a notification that includes a specification of at least approximate distances and directions of each of the set of users in comparison to the geographical location of the user. Or the notification module 206 may generate a notification that includes a specification of the sub-locations of each of the set of additional users at the location (e.g., a specific conference room, bathroom, or other sub-location of the location). In various embodiments, the communication module 208 may send the generated notification to the user.

In various embodiments, the location module 210 may be based on the establishment of geo-fences around the location, sub-locations, and users of the social networking system. As defined herein, a geo-fence is a virtual perimeter for a real-world geographic area. For example, a device of a user may be configured (e.g., via an application installed on the device) to send a communication to the social networking system when a user enters or exits a geo-fence. The geo-fences may be maintained by an administrator of the social networking system or by the users of the social networking system.

Thus, based on the notification, a user who is present at a location may be able to more easily find additional users of the social networking system who are present at the location and have a particular relationship with the user.

Figure 5:
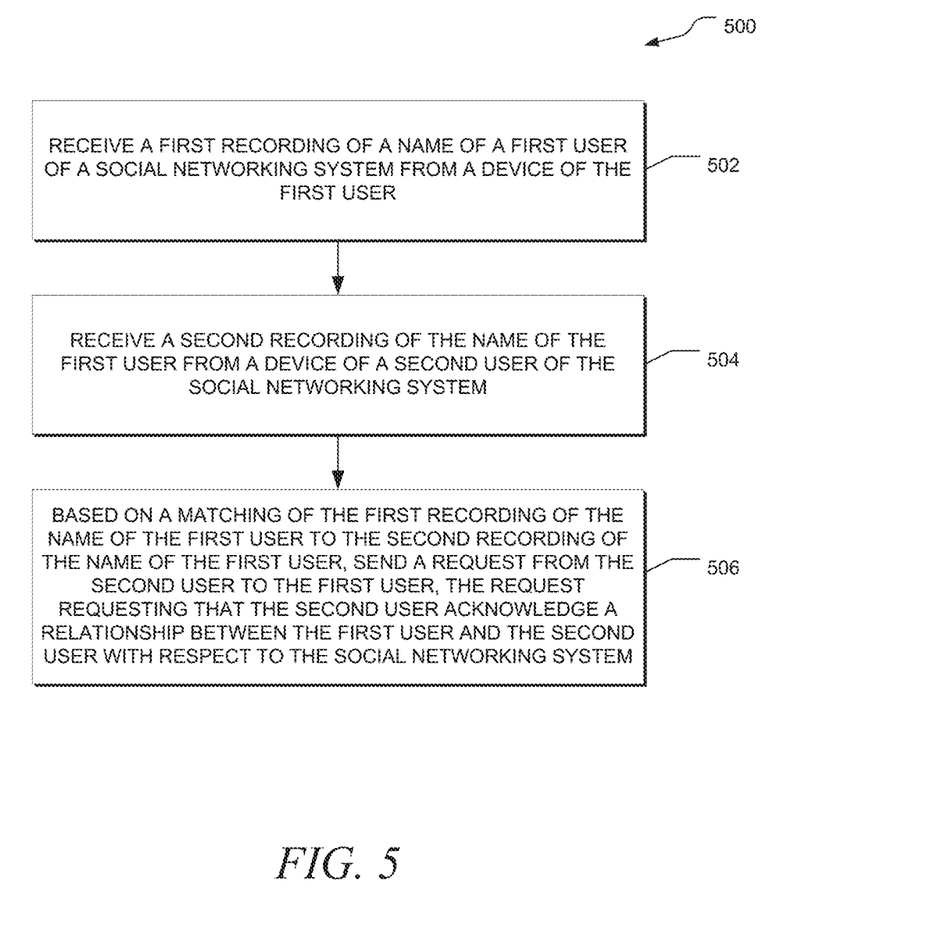
FIG. 5 is a flow chart illustrating example operations of a method of making it easier for a user of a social networking system to declare or acknowledge a relationship with a second user of the social networking system.

FIG. 5 is a flow chart illustrating example operations of a method 500 of making it easier for a user of a social networking system to declare or acknowledge a relationship with a second user of the social networking system. In various embodiments, the method 500 is implemented by one or more the modules 202-216 of FIG. 2. At operation 502, the communication module 208 may receive a first recording of a name of a first user of the social networking system. For example, the communication module 208 may receive the first recording of the name of the user from a device of the first user on which the first user records his name.

At operation 504, the communication module 208 may receive a second recording of the name of the first user. For example, the communication module 208 may receive the second recording of the name of the user from a device of a second user into which the first user speaks his name to be recorded.

At operation 506, based on a matching of the first recording of the name of the first user to the second recording of the name of the first user (e.g., based on the matching module 214 applying a voice-recognition function), the processing module 216 may send a request on behalf of the second user to the first user, the request requesting that the second user acknowledge a relationship between the first user and the second user with respect to the social networking system.

As an example, consider that the first person has a name that is difficult for the second person to understand or pronounce, such as a name that is native to a language that is foreign to the second person. In this case, the second person may have difficulty determining the spelling of the name of the second person such that the second person could easily search for the first person on the social networking system. Or assume that the first person has a name that is very common. In this case, the second person could have difficulty identifying which of the users having the same or similar names is the user he wishes to find on the social networking system.

In such cases, the second user may establish the first user as the particular user of the social networking system to which the second user wishes to connect by simply asking the first user to speak his name into an application executing on a mobile device (e.g., a smart phone) carried by the second user (or vice versa). The application may then communicate the recording of the spoken name of the first user along with an appropriate command to which the recording corresponds, such as a command to declare or acknowledge a relationship between the first person and the second person. In various embodiments, the particular command with which the recording is associated may be specified by the second user (e.g., by entering a command within the application). Upon receiving the communication containing the recording and the command, the processing module 216 may send a request to the first user or the second user to declare or acknowledge the relationship with the individual specifically identified by the recording. In this way, users who are present at the same location, but who may otherwise have difficulty declaring or acknowledging relationships between themselves with respect to the social networking system, may easily declare or acknowledge the relationship.

Figure 6:
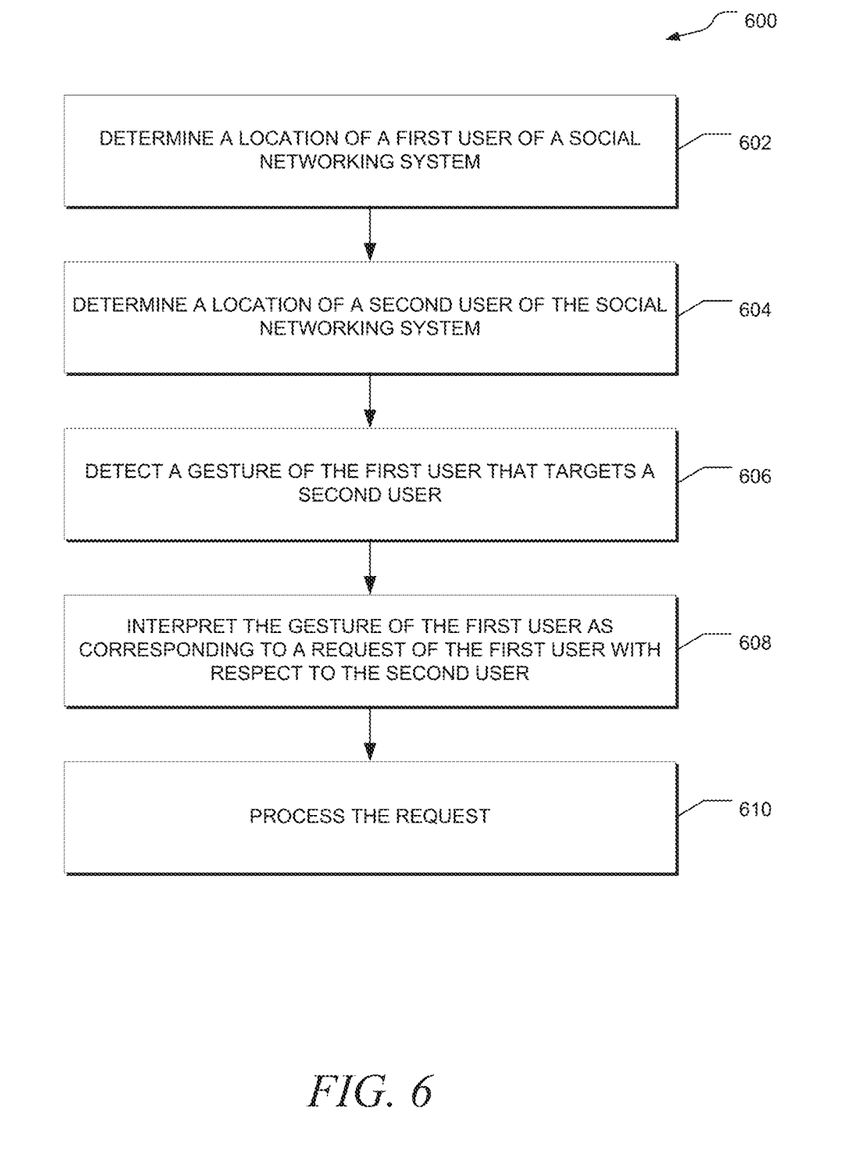
FIG. 6 is a flow chart illustrating example operations of a method of allowing a first user of a social networking system to use gestures directed to a second user of the social networking system to issue commands with respect to the social networking system.

FIG. 6 is a flow chart illustrating example operations of a method 600 of allowing a first user of a social networking system to use gestures directed to a second user of the social networking system to issue commands with respect to the social networking system. In various embodiments, the method 500 is implemented by one or more the modules 202-216 of FIG. 2. At operation 602, the location module 210 may determine a location of the first user of the social networking system.

At operation 604, the location module 210 may determine a location of the second user of the social networking system.

At operation 606, the detection module 202 may detect a gesture of the first user that targets a second user.

At operation 608, the interpretation module 204 may interpret the gesture of the first user as corresponding to a request of the first user with respect to the second user. For example, based on the first user pointing to the second user, the interpretation module 204 may determine that the first user wishes to determine an identity of the user with respect to the social networking system. Or, based on the first user giving a "thumbs-up" sign in the direction of the second user, the interpretation module 204 may determine that the first user wishes to declare a relationship between the first user and the second user with respect to the social networking system. In various embodiments, the user or an administrator may map particular gestures with particular commands that the first user may issue to the social networking system that pertain to the second user.

At operation 610, the processing module 216 processes the request. For example, the processing module 216 sends a request on behalf of the first user to the second user, the request asking the second user to confirm a relationship declared by the first user with respect to the second user. Or the processing module 216, on behalf of the first user, declares a relationship of the first user with respect to the second user, such as a connection or follower relationship.

Figure 7:
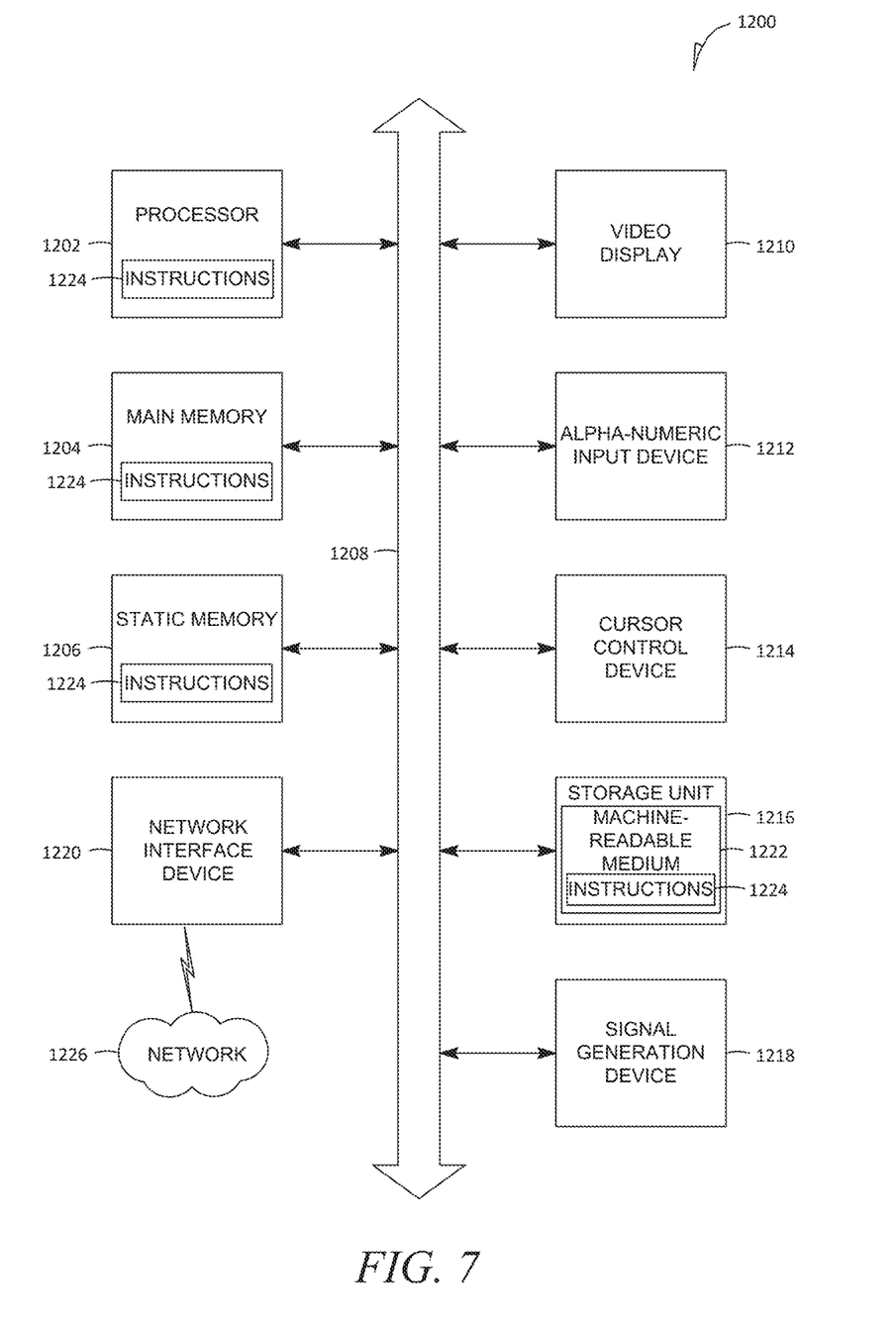
FIG. 7 is a block diagram of a machine in the example form of a computer system within which instructions for causing the machine to perform any one or more of the methodologies discussed herein may be executed.

FIG. 7 is a block diagram of a machine in the example form of a computer system 1200 within which instructions for causing the machine to perform any one or more of the operations or methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1200 includes a processor 1202 (e.g., a central processing unit (CPU), a graphics processing unit (GPU) or both), a main memory 1204 and a static memory 1206, which communicate with each other via a bus 1208. The computer system 1200 may further include a video display unit 1210 (e.g., a liquid crystal display (LCD) or a cathode ray tube (CRT)). The computer system 1200 also includes an alphanumeric input device 1212 (e.g., a keyboard), a user interface (UI) navigation (or cursor control) device 1214 (e.g., a mouse), a storage unit 1216, a signal generation device 1218 (e.g., a speaker) and a network interface device 1220.

The disk drive unit 1216 includes a machine-readable medium 1222 on which is stored one or more sets of data structures and instructions 1224 (e.g., software) embodying or utilized by any one or more of the methodologies or functions described herein. The instructions 1224 may also reside, completely or at least partially, within the main memory 1204 and/or within the processor 1202 during execution thereof by the computer system 1200, the main memory 1204 and the processor 1202 also constituting machine-readable media. The instructions 1224 may also reside, completely or at least partially, within the static memory 1206.

While the machine-readable medium 1222 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks: and compact disc-read-only memory (CD-ROM) and digital versatile disc (or digital video disc) read-only memory (DVD-ROM) disks.

The instructions 1224 may further be transmitted or received over a communications network 1226 using a transmission medium. The network 1226 may be one of the networks 1220. The instructions 1224 may be transmitted using the network interface device 1220 and any one of a number of well-known transfer protocols (e.g., Hyper Text Transfer Protocol (HTTP)). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:
incorporating one or more modules into a social networking system, the one or more modules configuring one or more processors of the social networking system to perform operations for notifying users of a social networking system of geographical movements of other users of the social networking system between virtual perimeters corresponding to a real-world location where a business event is being held, the operations comprising:
establishing a first virtual perimeter in one or more memories of the social networking system, the first virtual perimeter being a geo-fence corresponding to the real-world geographical area where the business event is being held;
determining that a first user of the social networking system is within the real-world geographical area based on a communication received from a client device of the first user, the communication indicating a location of the client device of the first user that corresponds to a location within the first virtual perimeter;
detecting an entering of a second user into the real-world geographical area based on a series of communications received from a client device of the second user, the series of communications indicating that the client device of the second user has moved to be within the first virtual perimeter;
communicating a first notification to the client device of the first user, the first notification notifying the first user of the detecting of the entering of the second user;
detecting an exiting of the second user from the real-world geographical area based on an additional series of communications received from the client device of the second user, the additional series of communications indicating that the client device of the second user is present outside the first virtual perimeter; and
communicating a second notification to the client device of the first user, the second notification notifying the first user of the detecting of the exiting of the second user.

2. The method of claim 1, further comprising:
establishing a second virtual perimeter in the one or more memories of the social networking system, the second virtual perimeter being a geo-fence corresponding to a sub-location of the real-world geographical area;
detecting an entering of the second user into the sub-location based on a further series of communications received from the client device of the second user, the further series of communications indicating that the client device of the second user has moved to be outside the second virtual perimeter; and
communicating a third notification to the client device of the first user, the third notification notifying the first user of relative locations of the client device of the first user and the client device of the second user.

3. The method of claim 2, wherein the real-world-geographical area corresponds to a facility where a business conference is being held and the sub-location is a specific conference room within the facility.

4. The method of claim 1, wherein the communicating of the first notification and the communicating of the second notification is based on an existence of a particular relationship between the first user and the second user.

5. The method of claim 4, wherein the particular relationship is one of an established connection or a follower relationship with respect to the social networking system.

6. The method of claim 1, wherein the particular relationship is that the first user has a commonality with the second user based on profile data maintained by the social networking system with respect to the first user and the second user.

7. The method of claim 1, wherein each of the first notification and the second notification includes a specification of a distance between the client device of the first user and the client device of the second user.

8. A system comprising:
one or more processors;
one or more memories;

one or more modules incorporated into the one or more memories, the one or more modules configuring the one or more processors to, at least:
  establish a first virtual perimeter in the one or more memories, the first virtual perimeter being a geo-fence corresponding to a real-world geographical area where a business event is being held;
  determine that a first user of the social networking system is within the real-world geographical area based on a communication received from a client device of the first user, the communication indicating a location of the client device of the first user that corresponds to a location within the first virtual perimeter;
  detect an entering of a second user into the real-world geographical area based on a series of communications received from a client device of the second user, the series of communications indicating that the client device of the second user has moved to be within the first virtual perimeter;
  communicate a first notification to the client device of the first user, the first notification notifying the first user of the detecting of the entering of the second user;
  detect an exiting of the second user from the real-world geographical area based on an additional series of communications received from the client device of the second user, the additional series of communications indicating that the client device of the second user is present outside the first virtual perimeter; and
  communicate a second notification to the client device of the first user, the second notification notifying the first user of the detecting of the exiting of the second user.

9. The system of claim 8, the one or more modules configuring the one or more processors further to:
  establish a second virtual perimeter in the one or more memories, the second virtual perimeter being a geo-fence corresponding to a sub-location of the real-world geographical area;
  detect an entering of the second user into the sub-location based on a further series of communications received from the client device of the second user, the further series of communications indicating that the client device of the second user has moved to be outside the second virtual perimeter; and
  communicate a third notification to the client device of the first user, the third notification notifying the first user of relative locations of the client device of the first user and the client device of the second user.

10. The system of claim 9, wherein the real-world-geographical area corresponds to a facility where a business conference is being held and the sub-location is a specific conference room within the facility.

11. The system of claim 8, wherein the communicating of the first notification and the communicating of the second notification is based on an existence of a particular relationship between the first user and the second user.

12. The system of claim 11, wherein the particular relationship is one of an established connection or a follower relationship with respect to the social networking system.

13. The system of claim 8, wherein the particular relationship is that the first user has a commonality with the second user based on profile data maintained by the social networking system with respect to the first user and the second user.

14. The method of claim 8, wherein each of the first notification and the second notification includes a specification of a distance between the client device of the first user and the client device of the second user.

15. A non-transitory machine-readable medium storing instructions that, when executed by at least one processor of a machine, cause the machine to perform operations comprising:
  establishing a first virtual perimeter in one or more memories of a social networking system, the first virtual perimeter being a geo-fence corresponding to a real-world geographical area where a business event is being held;
  determining that a first user of the social networking system is within the real-world geographical area based on a communication received from a client device of the first user, the communication indicating a location of the client device of the first user that corresponds to a location within the first virtual perimeter;
  detecting an entering of a second user into the real-world geographical area based on a series of communications received from a client device of the second user, the series of communications indicating that the client device of the second user has moved to be within the first virtual perimeter;
  communicating a first notification to the client device of the first user, the first notification notifying the first user of the detecting of the entering of the second user;
  detecting an exiting of the second user from the real-world geographical area based on an additional series of communications received from the client device of the second user, the additional series of communications indicating that the client device of the second user is present outside the first virtual perimeter, and
  communicating a second notification to the client device of the first user, the second notification notifying the first user of the detecting of the exiting of the second user.

16. The non-transitory machine-readable medium of claim 15, the operations further comprising:
  establishing a second virtual perimeter in the one or more memories, the second virtual perimeter being a geo-fence corresponding to a sub-location of the real-world geographical area;
  detecting an entering of the second user into the sub-location based on a further series of communications received from the client device of the second user, the further series of communications indicating that the client device of the second user has moved to be outside the second virtual perimeter; and
  communicating a third notification to the client device of the first user, the third notification notifying the first user of relative locations of the client device of the first user and the client device of the second user.

17. The non-transitory machine-readable medium of claim 15, wherein the real-world-geographical area corresponds to a facility where a business conference is being held and the sub-location is a specific conference room within the facility.

18. The non-transitory machine-readable medium of claim 15, wherein the communicating of the first notification and the communicating of the second notification is based on an existence of a particular relationship between the first user and the second user.

19. The non-transitory machine-readable medium of claim 18, wherein the particular relationship is one of an established connection or a follower relationship with respect to the social networking system.

20. The non-transitory machine-readable medium of claim 15, wherein the particular relationship is that the first user has a commonality with the second user based on profile data maintained by the social networking system with respect to the first user and the second user.

\* \* \* \* \*

UNITED STATES PATENT AND TRADEMARK OFFICE
CERTIFICATE OF CORRECTION

PATENT NO. : 9,872,138 B2  
APPLICATION NO. : 15/357581  
DATED : January 16, 2018  
INVENTOR(S) : Sameer Sayed Page 1 of 1

It is certified that error appears in the above-identified patent and that said Letters Patent is hereby corrected as shown below:

In the Claims

In Column 16, Line 35, in Claim 15, delete "perimeter," and insert --perimeter;-- therefor Signed and Sealed this
Twenty-eighth Day of May, 2019

Andrei Iancu
*Director of the United States Patent and Trademark Office*